United States Patent
Akiyama et al.

(10) Patent No.: US 8,976,422 B2
(45) Date of Patent: Mar. 10, 2015

(54) IMAGE FORMING APPARATUS, LENS ARRAY AND FORMING METHOD OF SAME

(71) Applicant: Toshiba Tec Kabushiki Kaisha, Tokyo (JP)

(72) Inventors: Ryozo Akiyama, Shizuoka (JP); Atsushi Kubota, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/786,145

(22) Filed: Mar. 5, 2013

(65) Prior Publication Data

US 2013/0235434 A1 Sep. 12, 2013

(30) Foreign Application Priority Data

Mar. 6, 2012 (JP) .................................. 2012-049589

(51) Int. Cl.
*H04N 1/04* (2006.01)
*G02B 3/00* (2006.01)
*G02B 27/00* (2006.01)

(52) U.S. Cl.
CPC ............ *G02B 3/0068* (2013.01); *G02B 3/0012* (2013.01); *G02B 27/0018* (2013.01)
USPC ............ 358/474; 358/483; 358/509; 359/642

(58) Field of Classification Search
CPC ............. G02B 27/123; G02B 27/0966; G02B 27/0961; G02B 3/0062; G02B 13/22; G02B 7/021; G02B 7/02; G02B 3/0068; H04N 1/0312

USPC ................. 358/474, 483, 513, 514, 475, 509; 359/642, 355, 819
See application file for complete search history.

(56) References Cited

U.S. PATENT DOCUMENTS

| | | | | |
|---|---|---|---|---|
| 5,032,713 A * | 7/1991 | Eguchi et al. | ............... | 250/214.1 |
| 5,581,076 A * | 12/1996 | Tabata | ........................ | 250/208.1 |
| 5,661,540 A * | 8/1997 | Kaihotsu et al. | ................... | 355/1 |
| 5,783,820 A * | 7/1998 | Takami | ........................ | 250/239 |
| 6,147,339 A * | 11/2000 | Matsumoto | ................ | 250/208.1 |
| 6,331,878 B1 * | 12/2001 | Takahara | ........................... | 349/5 |
| 6,368,523 B1 * | 4/2002 | Buazza et al. | ................ | 264/1.36 |
| 6,449,414 B1 * | 9/2002 | Tahara et al. | .................. | 385/120 |

(Continued)

FOREIGN PATENT DOCUMENTS

| | | |
|---|---|---|
| JP | 2000075106 | 3/2000 |
| JP | 2000108216 | 4/2000 |

(Continued)

OTHER PUBLICATIONS

Japanese Office Action dated Jan. 21, 2014, filed in Japanese counterpart Application No. 2012-049589, 13 pages (with translation).

*Primary Examiner* — Negussie Worku
(74) *Attorney, Agent, or Firm* — Patterson & Sheridan, LLP (57) ABSTRACT

A lens array includes a transparent substrate arranged on a plane perpendicular to an optical axis, first lenses, which are arranged in a main scanning direction with respect to an light incident on the transparent substrate, and which condense the light, light shielding portions arranged on the transparent substrate except in areas of the first lenses to shield the light, and second lenses, which are laminated on the first lenses, and which are made of a material with a wettability different from that of a material of the first lenses.

21 Claims, 9 Drawing Sheets

(56) References Cited

U.S. PATENT DOCUMENTS

| | | | |
|---|---|---|---|
| 6,455,834 B2* | 9/2002 | Fujimoto et al. | 250/208.1 |
| 6,466,338 B1* | 10/2002 | Wada | 358/471 |
| 6,563,104 B2* | 5/2003 | Ogi et al. | 250/208.1 |
| 6,646,807 B2* | 11/2003 | Yoshikawa et al. | 359/619 |
| 7,317,562 B2* | 1/2008 | Sawada | 358/509 |
| 7,592,584 B2* | 9/2009 | Otsuka et al. | 250/231.13 |
| 7,609,445 B2* | 10/2009 | Hamagishi | 359/463 |
| 7,920,301 B2* | 4/2011 | Kobayashi | 358/474 |
| 8,009,361 B2* | 8/2011 | Nomura et al. | 359/619 |
| 8,089,709 B2* | 1/2012 | Ito | 359/793 |
| 8,107,138 B2* | 1/2012 | Minobe et al. | 358/483 |
| 8,446,646 B2* | 5/2013 | Yamaguchi et al. | 358/474 |
| 8,593,700 B2* | 11/2013 | Mamada et al. | 358/474 |
| 8,618,656 B2* | 12/2013 | Oh et al. | 257/728 |
| 8,681,397 B2* | 3/2014 | Kusaka et al. | 358/474 |
| 8,698,865 B2* | 4/2014 | Nemoto | 347/241 |
| 8,727,575 B2* | 5/2014 | Nakabayashi et al. | 362/300 |
| 8,773,615 B2* | 7/2014 | Ozawa | 349/62 |
| 8,848,274 B2* | 9/2014 | Ozawa | 359/245 |
| 2002/0008916 A1 | 1/2002 | Nishikawa et al. | |
| 2011/0228398 A1 | 9/2011 | Sasaki et al. | |

FOREIGN PATENT DOCUMENTS

| | | |
|---|---|---|
| JP | 2001330709 | 11/2001 |
| JP | 2006110729 A | 4/2006 |
| JP | 2007057855 A | 3/2007 |
| JP | 2012185240 | 9/2012 |

\* cited by examiner

IMAGE FORMING APPARATUS, LENS ARRAY AND FORMING METHOD OF SAME

CROSS-REFERENCE TO RELATED APPLICATION

This application is based upon and claims the benefit of priority from Japanese Patent Application No. 2012-049589, filed Mar. 6, 2012; the entire contents of which are incorporated herein by reference.

FIELD

Embodiments described herein relate generally to an image forming apparatus, a lens array and a forming method thereof.

BACKGROUND

The micro-lens array is expected to find applications in various fields, such as optical systems of electronic copiers and FAX machines, optical print heads of light-emitting diode (LED) or liquid crystal display (LCD) printers, and in liquid crystal display devices, solid-state image pickup elements, multiple image transmission by optical interconnection, confocal-type laser microscopes, and other applications in the optical communication field, optical disk field, image display field, image transmission/coupling field, optical measurement and optical sensing field, optical processing field, etc. Usually, such micro-lens arrays are required to have a high quality (high resolution) free of stray light.

For the lens array, it is necessary to form plural lenses. As the method for forming a row of plural lenses on a transparent substrate, the following scheme for forming the micro-lens array may be adopted: after a light shielding layer is formed on a transparent substrate, the portions between the light shielding layer are filled up with a lens material (pixel sections) by using an inkjet method, followed by heating to have the lens material in a curved shape for forming the micro-lens array. Unfortunately, for the lens array prepared using this method, it is impossible to obtain excellent optical characteristics.

DETAILED DESCRIPTION

Embodiments provide a lens array with excellent optical characteristics, a forming method thereof, and an image forming apparatus. In general, according to one embodiment, the present disclosure will be explained with reference to the drawings. This disclosure relates to a lens array and a forming method thereof. In the following, the structure of the lens array and the forming method thereof will be explained in detail with reference to FIG. 5 and thereafter. Before going to the detailed explanation, the image forming apparatus where the lens array is adopted will be explained. Here, the lens array of the present disclosure may also be adopted in scanners, etc. The image forming apparatus here also includes the scanners, etc.

In order to realize the purpose, an image forming apparatus according to an embodiment includes a lens array having a transparent substrate arranged on a plane perpendicular to an optical axis, first lenses, which are arranged in a main scanning direction with respect to light incident on the transparent substrate, and which condense the light, light shielding portions arranged on the transparent substrate except in areas of the first lenses to shield the light, and second lenses, which are laminated on the first lenses, and which are made of a material with a wettability different from that of a material of the first lenses. as used herein, wettability is the degree or extent to which a material absorbs or can be made to absorb moisture.

Figure 1:
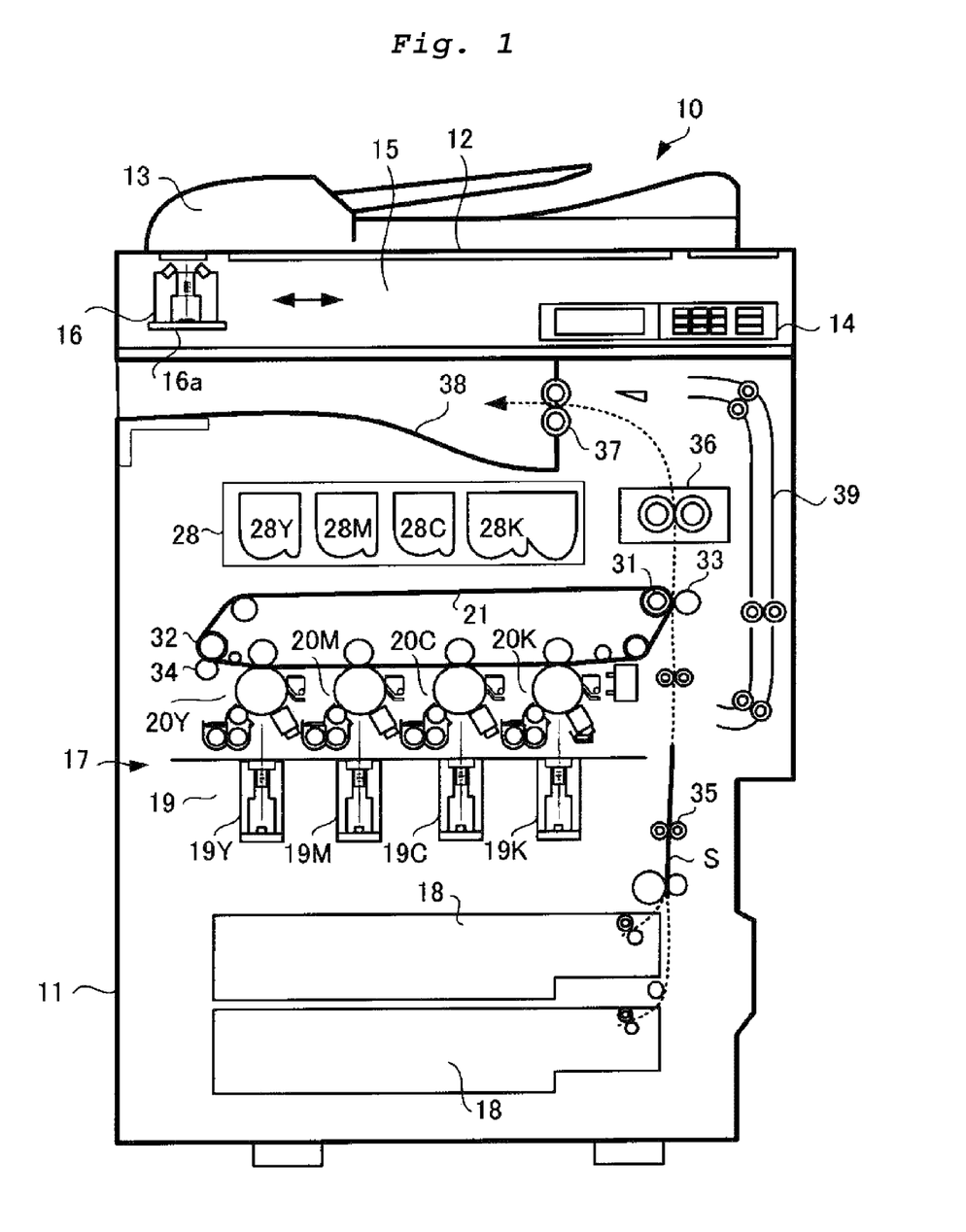
FIG. 1 is a diagram illustrating a structure of a multifunction peripheral according to an embodiment.

The same keys will be adopted throughout the drawings in this explanation. FIG. 1 is a diagram illustrating the configuration of the image forming apparatus according to an embodiment. As shown in FIG. 1, the image forming apparatus refers to the composite apparatus such as MFPs (Multi-Function Peripherals), printers, copiers, etc. In the following, explanation will be made using an MFP as an example.

There is a platen 12 made of a transparent glass arranged on top of a main body 11 of an MFP 10. An automatic original document feeding section (ADF) 13 is arranged on the platen 12. There is also a control panel 14 on top of the main body 11. The control panel 14 has various types of keys and a touch panel-type display unit.

A scanner unit 15 is arranged as a read device beneath the ADF 13 in the main body 11. The scanner unit 15 scans an original document fed by the ADF 13 or set on the platen to generate image data. The scanner unit 15 has an image reading unit 16 containing a close contact-type image sensor 16a (hereinafter to be referred to as image sensor). The image sensor 16a is arranged in the main scanning direction (the depth direction in FIG. 1).

When the image of the original document set on the platen 12 is read, the image sensor 16a is driven to move along the platen 12, and the image sensor 16a reads the original document image one line at a time. This operation is carried out for the entirety of the original document size, and one page of the original document is read. When the image of the original document fed by the ADF 13 is read, the image reading unit 16 is at an anchored position (the position shown in the drawing).

In addition, there is a printer unit 17 at the central portion in the main body 11. In the lower portion of the main body 11, there are plural cassettes 18 for accommodating the paper sheets in various sizes, respectively. The printer unit 17 has a photoreceptor drum and a scanning head 19 containing LEDs as an exposure device. Light rays from the scanning head 19 are used to scan the photoreceptor to generate an image.

The printer unit 17 processes the image data read by the scanner unit 15 and the image data prepared by a PC (personal computer) or the like, and forms an image on the paper sheet (to be explained in detail later). For example, the printer unit 17 may be a color laser printer of a tandem system. The printer unit 17 contains image forming sections for various colors, that is, an image forming section 20Y for yellow (Y), an image forming section 20M for magenta (M), and an image forming section 20K for black (K). Here, the image forming sections 20Y, 20M, 20C and 20K are arranged side by side on the downstream side on the lower side of an intermediate transcribing belt 21. Also, the scanning head 19 has plural scanning heads 19Y, 19M, 19C and 19K corresponding to the image forming sections 20Y, 20M, 20C and 20K, respectively.

Figure 2:
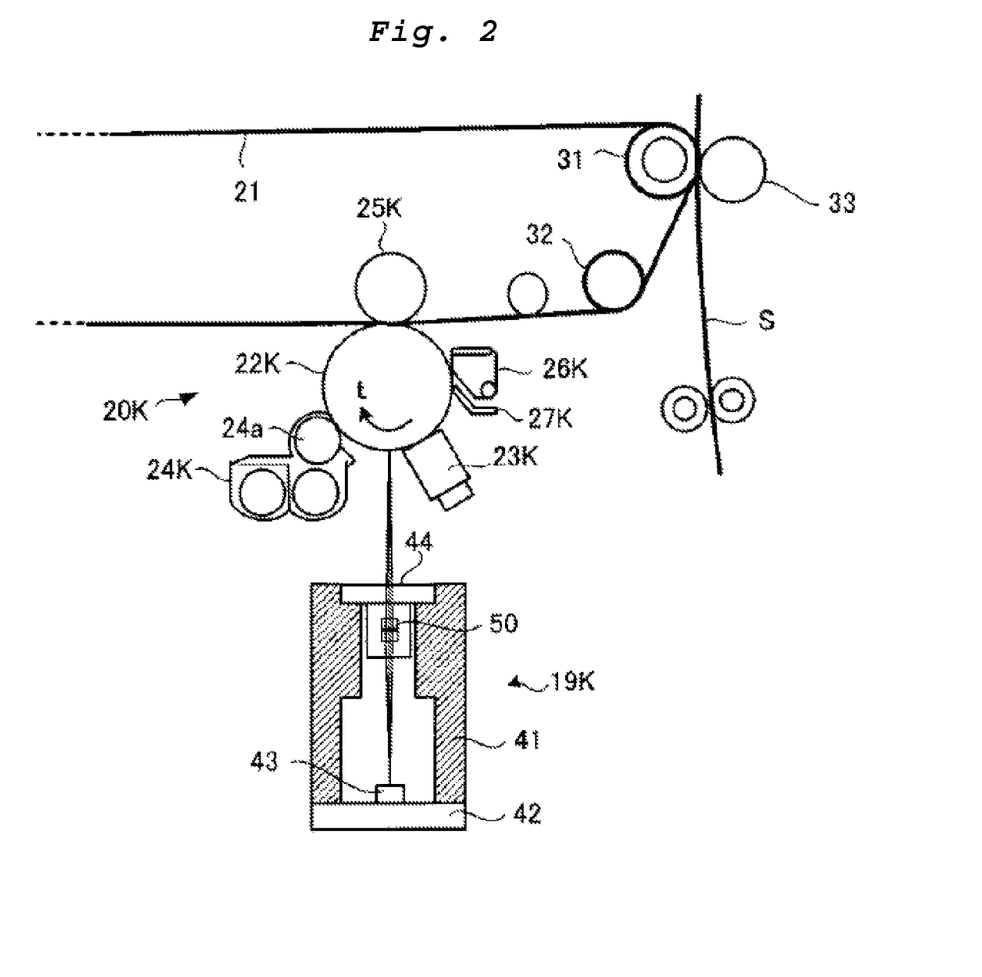
FIG. 2 is a diagram illustrating a portion for forming an optical latent image and for printing in the structure shown in FIG. 1.

FIG. 2 is an enlarged view illustrating the structure of the image forming section 20K among the image forming sections 20Y, 20M, 20C and 20K. In the following explanation, because the various image forming sections 20Y, 20M, 20C and 20K have the same configuration, image forming section 20K will be explained as their representative example.

As shown in FIG. 2, the image forming section 20K has a photoreceptor drum 22K as an image carrier. On the periphery of the photoreceptor drum 22K, the following parts are arranged along the rotating direction t: a charger 23K, a developing unit 24K, a primary transfer roller 25K, a cleaner 26K, a blade 27K, etc. The light from the scanning head 19K is irradiated at the exposure position of the photoreceptor drum 22K to form an electrostatic latent image on the photoreceptor drum 22K.

The charger 23K of the image forming section 20K charges the entire surface of the photoreceptor drum 22K evenly. In the developing unit 24K, by a developing roller 24a with a development bias applied on the developing roller 24a, among the 2-ingredient developer containing a black toner and a carrier, the toner is fed to the photoreceptor drum 22K. The cleaner 26K contains the blade 27K that removes the residual toner on the surface of the photoreceptor drum 22K.

As shown in FIG. 1, in the upper portions of the image forming sections 20Y to 20K, a toner cartridge unit 28 feeding the toners to the developing units 24Y-24K is arranged. The toner cartridge unit 28 contains the toner cartridges for the various colors of yellow (Y), magenta (M), cyan (C) and black (K).

The intermediate transcribing belt 21 makes circulatory movement. The intermediate transcribing belt 21 is set on a drive roller 31 and a driven roller 32. The intermediate transcribing belt 21 faces and is in contact with the photoreceptor drums 22Y to 22K. At the position of the intermediate transcribing belt 21 facing the photoreceptor drum 22K, the primary transcribing voltage is applied by the primary transfer roller 25K, and the toner image on the photoreceptor drum 22K is transcribed to the intermediate transcribing belt 21 in the primary transcribing operation.

The drive roller 31, on which the intermediate transcribing belt 21 is set, is arranged facing a secondary transfer roller 33. As the paper sheet S passes through between the drive roller 31 and the secondary transfer roller 33, the secondary transcribing voltage is applied from the secondary transfer roller 33 onto the paper sheet S. Then, the toner image on the intermediate transcribing belt 21 is transcribed to the paper sheet S. A belt cleaner 34 is arranged near the driven roller 32 of the intermediate transcribing belt 21.

Also, as shown in FIG. 1, a conveyor roller 35 for transporting the paper sheet S taken out from within the paper feeding cassette 18 is arranged between the paper feeding cassette 18 and the secondary transfer roller 33. In addition, a fixing unit 36 is arranged downstream from the secondary transfer roller 33. Besides, a conveyor roller 37 is arranged downstream from the fixing unit 36. Then, the paper sheet S is discharged by the conveyor roller 37 to a paper discharge unit 38.

In addition, a reverse conveying path 39 is arranged downstream from the fixing unit 36. The reverse conveying path 39 has the paper sheet S inverted and guided towards the secondary transfer roller 33, and the reverse conveying path 39 is adopted for double-sided printing.

In the following, the configuration of the scanning head 19K will be explained with reference to FIG. 2. The scanning head 19K works as an exposure device facing the photoreceptor drum 22K. The photoreceptor drum 22K is driven to rotate at a prescribed rotating velocity, and a charge is accumulated on the surface. The light from the scanning head 19K is irradiated to exposure the photoreceptor drum 22K, and an electrostatic latent image is formed on the surface of the photoreceptor drum 22K.

The scanning head 19K has a lens array 50. The lens array 50 is supported by a holding member 41. Also, on the bottom portion of the holding member 41, there is a supporting body 42. On the supporting body 42, LED elements 43 as light emitting elements are arranged. Here, the LED elements 43 are arranged equidistantly in linear configuration in the main scanning direction. Also, a substrate (not shown in the drawing) containing a driver integrated circuit (IC) that controls light emission of the LED elements 43 is arranged on the supporting body 42. Here, the configuration of the lens array 50 will be explained in detail later.

The drive IC forms the control unit. On the basis of the image data, the drive IC generates a control signal of the scanning head 19K, and the LED elements 43 emit light with a prescribed light quantity according to the control signal. Then, the light rays emitted from the LED elements 43 are incident on the lens array 50, and the light rays pass through the lens array 50 and form an image on the photoreceptor drum 22K. The image is formed on the photoreceptor drum 22K. Also, a cover glass 44 is attached on the upper portion (exit side) of the scanning head 19K.

Figure 3:
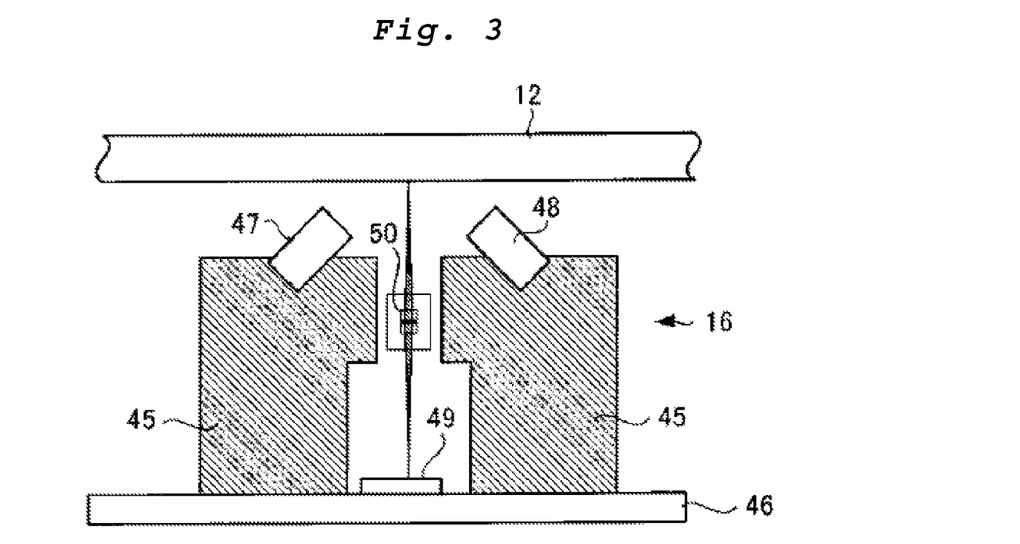
FIG. 3 is a diagram illustrating a mechanism of an optical system in FIG. 2.

FIG. 3 is a diagram illustrating the configuration of the image reading unit 16. The image sensor 16a (49) reads the image of the original document carried on the platen 12 or the image of the original document fed by the ADF 13 under control of the operation of the control panel 14. The image sensor 16a is a one-dimensional sensor arranged in the main scanning direction, and the image sensor 16a has a casing 45. The casing 45 is arranged on a substrate 46. On the upper surface of the casing 45 on the platen 12 side, two LED line illuminating devices 47 and 48 that irradiate light towards the original document are arranged extending in the main scanning direction (the depth direction as shown in the drawing). The LED line illuminating devices 47 and 48 each have a lens array and a light conducting member. However, the light source is not limited to the LEDs. One may also a adopt fluorescent lamp, xenon pipe, cold cathode pipe or organic electroluminescent (EL), etc.

The lens array 50 is supported between the LED line illuminating device 47 and the LED line illuminating device 48 in the upper portion of the casing 45. On the substrate 46 in the bottom portion of the casing 45, the sensor 49 made of charge-coupled device (CCD) or complementary metal oxide semiconductor (CMOS), etc., is assembled. The LED line illuminating devices 47 and 48 illuminate the image read position of the original document on the platen 12, and the light reflected from the image read position is made incident on the lens array 50. The lens array 50 works as an upright one-to-one lens. The light incident on the lens array 50 exits from the exit surface of the lens array 50, and the light forms an image on the sensor 49. The light of the image is then converted by the sensor 49 to an electric signal, and the electric signal is transmitted to the memory portion (not shown in the drawing) of the substrate 46.

In this embodiment, the MFP is explained as an example of the image forming apparatus. However, the image forming apparatus is not limited to the MFP. It is also possible to use a printer or a scanner or the like.

Figure 4A:
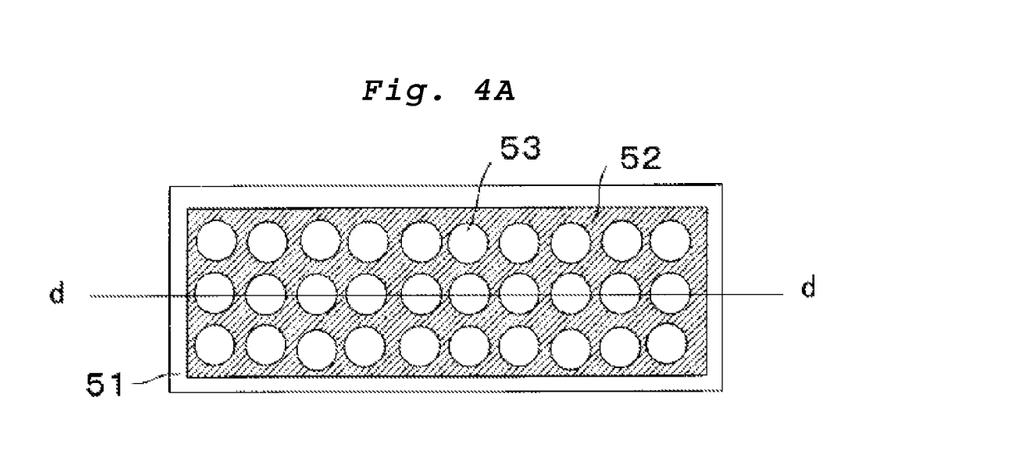
FIGS. 4A and 4B include a plane view and a cross-sectional view illustrating a lens array according to an embodiment.
Figure 4B:
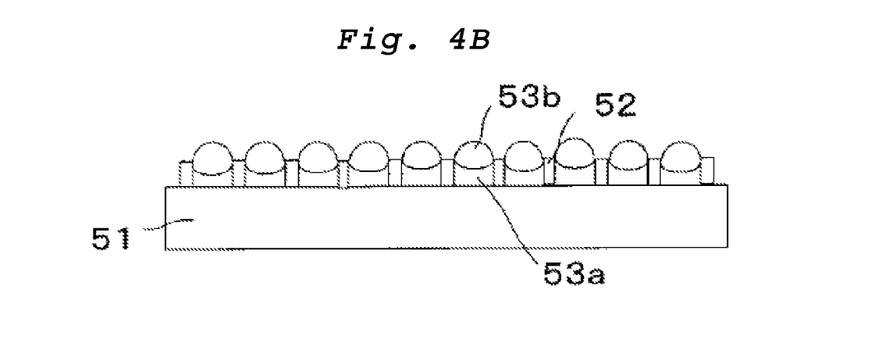

In the following, the configuration of the lens array 50 (imaging element array) will be explained. FIG. 4A is a plane view illustrating the micro-lens array illustrating the state of the configuration of the lens array. FIG. 4B is a cross-sectional view taken across d-d in FIG. 4A.

A light shielding portion 52 is arranged on a transparent substrate 51. A micro-lenses 53 are arranged as a row on a light shielding portion 52. As to be explained later, the micro-lens includes two lenses, that is, a first lens 53a and a second lens 53b. For example, as shown in FIG. 3, the light from the object point on the front side (platen 12) is received via the lens array 50 by the sensor 49.

Figure 5:
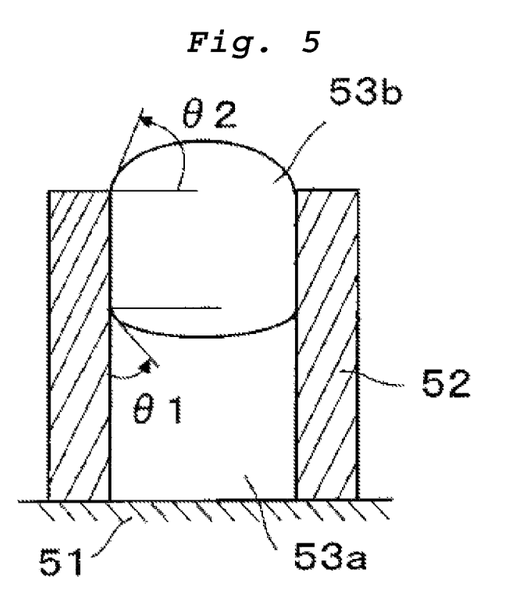
FIG. 5 is an enlarged partial view of the lens array shown in FIGS. 4A and 4B.

The two lenses have a two-layer structure, and they are formed from lens materials having different wettability with respect to the light shielding portion 52 and are formed by using an inkjet method. An inkjet method is described below with reference to FIG. 6. The wettability is usually determined by measuring the contact angle. According to the present embodiment, the contact angles of the first lens and the second lens with respect to the light shielding portion 52 are defined as $\theta 1$ and $\theta 2$, respectively. The better the wettability, the smaller the contact angle. As shown in FIG. 5, the contact angle of the first lens with respect to the light shielding portion is 90° or smaller. Of course, the contact angle $\theta 1$ of the first lens may also be 90° or larger. On the other hand, for the contact angle $\theta 2$ of the second lens, the wettability is sufficiently suppressed. More specifically, the contact angle is preferably about 60° or larger. As the contact angle is 60° or larger, it is possible to have a larger curvature for the lens so that it is possible to have a shorter focal distance. As each lens has a two-layer structure, it is possible to have a shorter focal distance for each lens. On the contrary, if the contact angle is 90° or larger, stray light is prone to taking place, and the lens characteristics (light condensing) may degrade.

In the following, with reference to FIGS. 9A to 9C, the contact angles $\theta$ of the materials (inks) of the first lens 53a and the second lens 53b with respect to the light shielding portion 52 will be explained.

Figure 9A:
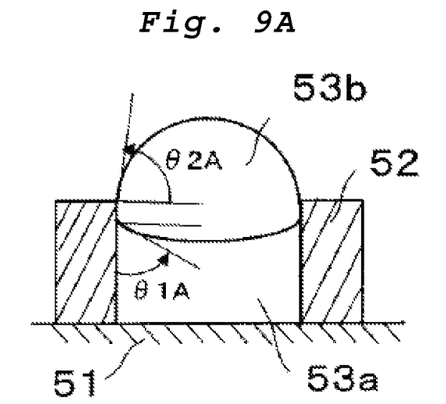
FIGS. 9A and 9B are diagrams illustrating a structure of the lens array.
Figure 9B:
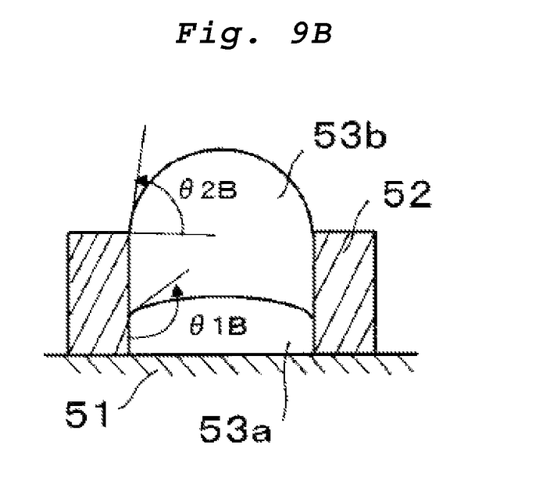
Figure 9C:
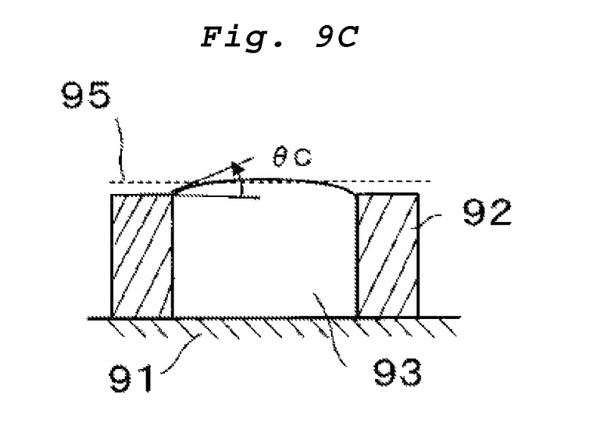
FIG. 9C is a diagram illustrating a structure of a light shielding portion and lenses in the related art.

FIG. 9C illustrates a structure of a light shielding portion and lenses in the related art. Here, a light shielding portion 92 is arranged on a transparent substrate 91, and a layer of lenses 93 is arranged between the portions of the light shielding portion 92.

The contact angle of the material (ink) of the lenses 93 with respect to the material of the light shielding portion 92 is $\theta c$. When the contact angle $\theta c$ is smaller, that is, when the wettability is better, the surface of the lenses 93 becomes flatter. Then, as indicated by the broken line 95, the adjacent lenses 93 may be joined to each other over the light shielding portion 92 to form an integrated member.

Different from what shown in FIG. 5, FIG. 9A shows an example in which the contact angle $\theta 1A$ of the first lens is 90° or smaller, and the contact angle $\theta 2A$ of the second lens is larger than $\theta 1A$, and FIG. 9B shows an example in which the contact angle $\theta 1B$ is 90° C. or larger, and the contact angle $\theta 1B$ is larger than the contact angle $\theta 2B$ of the second lens. In this way, the contact angle of the first lens may be 90° or larger.

Compared with the related art shown in FIG. 9C, in the embodiment shown in FIGS. 9A and 9B, the wettability is very poor, and the contact angle $\theta 2$ becomes larger.

Compared with the ink of the first lens 53a, the ink of the second lens 53b has a poorer wettability with the surface of the light shielding portion 52, and the convex shaped meniscus is formed smoothly from the surface with the height of the light shielding portion 52. As the wettability is suppressed, the spread of the wetting portion on the upper surface of the light shielding portion 52 is smaller, and the lens shape can be formed up to the surface with the height of the light shielding portion 52. Additionally, the printing quantity of the second lens ink can be adjusted in a range such that the ink is not spread to the light shielding portion 52. Consequently, it is possible to control the shape of the curved surface of the lens within the range of the variable quantity.

When the contact angle of the second lens is small, the desired lens characteristics range is limited, or the curing operation until the second lens is cured by ultraviolet (UV) light or heat is limited. Consequently, the wettability is sufficiently suppressed, that is, the contact angle is set over a certain level, e.g., about 60° or larger, so the light condensing property is improved, and it is possible to realize excellent lens characteristics and to improve the degree of freedom in the formation operation.

The higher the light shielding property of the light shielding portion 52 in shielding the light, the better the characteristics of the micro-lens array. That is, the light shielding portion 52 can shield the stray light. In this case, the light shielding property can be determined by measuring, e.g., the transmission density (also known as, optical density or OD value). Transmission density of a substance is a measure of the extent to which the substance transmits light or other electromagnetic radiation. In this case, the transmission density can be measured by, e.g., 361T manufactured by X-rite Corp. When the transmission density is 6 or higher, the transmitted light can almost entirely be shielded.

Figure 6:
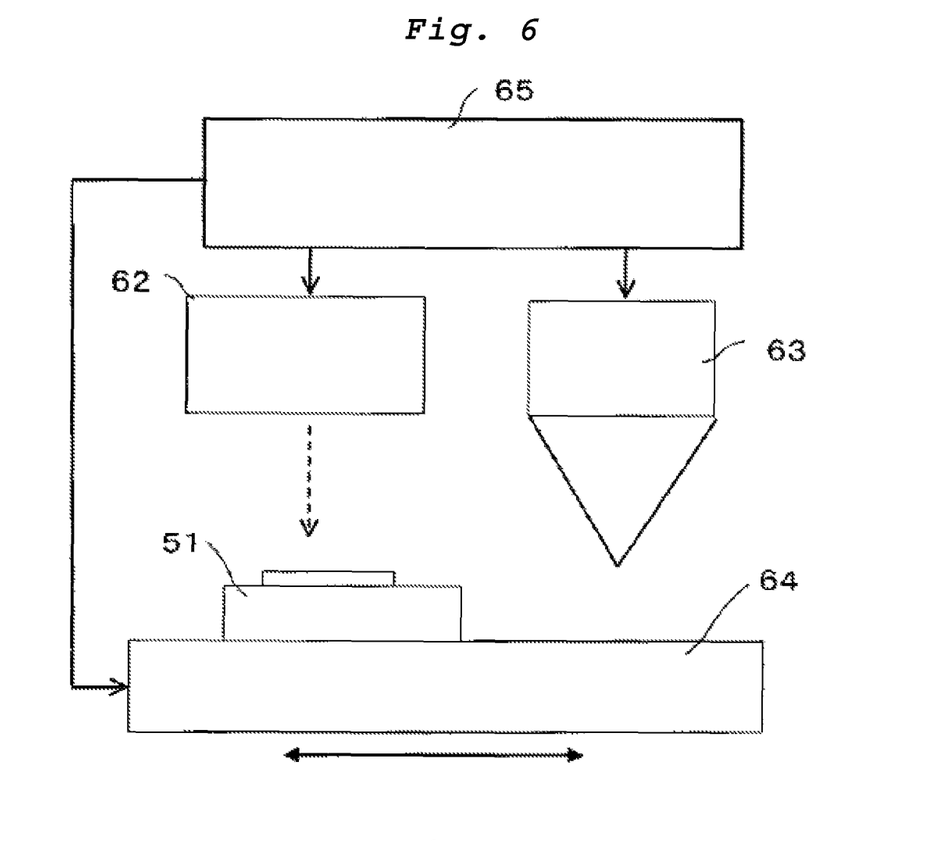
FIG. 6 is a schematic diagram illustrating a lens array forming device according to an embodiment.
Figure 7:
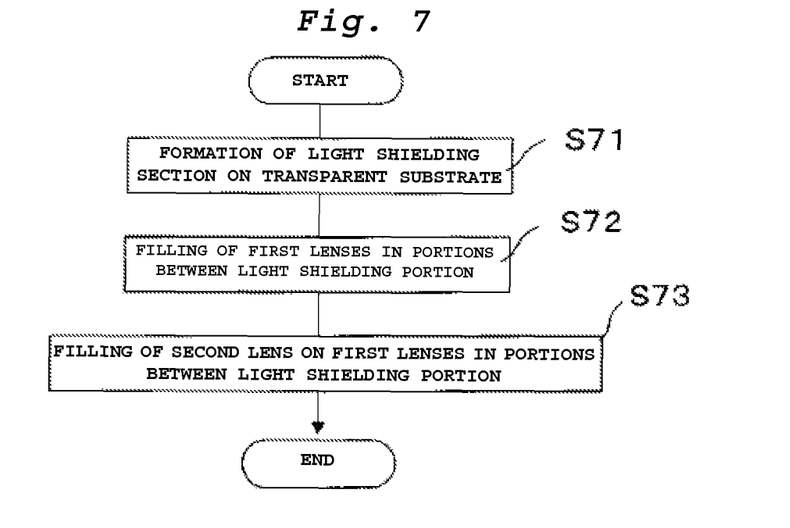
FIG. 7 is a flow chart illustrating a forming method of the lens array according to an embodiment.

FIG. 6 is a schematic diagram illustrating the device for forming the lens array including micro-lenses formed on a transparent substrate. The light shielding portion and the lenses are formed by using the inkjet method. Also, FIG. 7 is a flow chart illustrating the forming method of the lens array. FIGS. 8A to 8E illustrate the process in which the light shielding portion 52, the first lens 53a and the second lens 53b are sequentially formed on the transparent substrate 51.

Here, the light shielding portion 52, the first lens 53a and the second lens 53b are first formed from the materials by using the inkjet method and then cured. However, the uncured materials may also be prepared as the light shielding portion 52, the first lens 53a and the second lens 53b. Also, the UV curable ink for the light shielding member may also be abbreviated as the light shielding ink, and the UV curable inks of the first and second lens materials may also be called the first lens ink and the second lens ink. Also, the material of the light shielding portion, the material of the first lens and the material of the second lens may be abbreviated as the light shielding portion, the first lens and the second lens.

In step S71 shown in FIG. 7, the light shielding portion 52 is formed on the transparent substrate 51. As shown in FIG. 6, 62 represents the inkjet printing portion, and the UV curable ink is ejected to the position needed for forming the light shielding portion 52 on the transparent substrate 51. 63 represents the UV light irradiating section. The UV light is irradiated on the UV curable ink ejected on the transparent substrate 51, and the UV light is used for curing the UV curable ink. The transparent substrate 51 is anchored on a conveyor bed 64. The conveyor bed 64 is transported by a position control unit 65, and the position of the transparent substrate 51 is controlled.

Figure 8A:
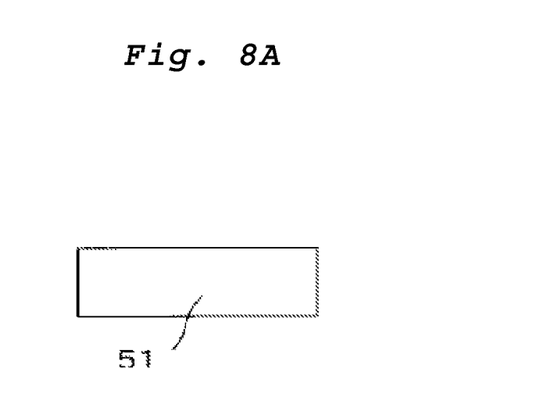
FIGS. 8A to 8E are diagrams illustrating the various steps in the method for forming the lens array.
Figure 8B:
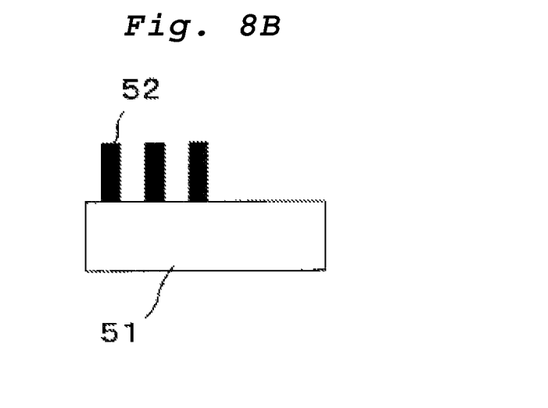
Figure 8C:
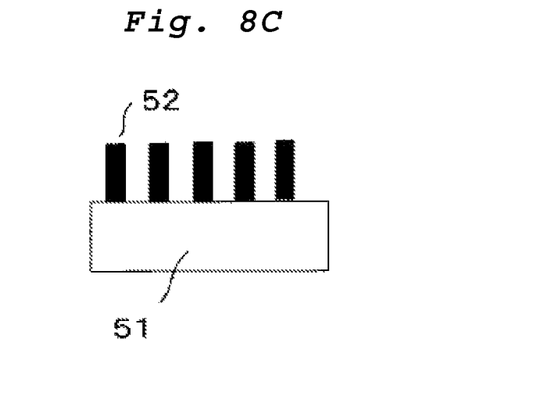

FIG. 8A also shows the transparent substrate 51 where light shielding portion 52 has not yet been formed. FIG. 8B shows the state in which the light shielding portion 52 is formed halfway. FIG. 8C shows the state in which all of the portions of the light shielding portion 52 are entirely formed.

Figure 8D:
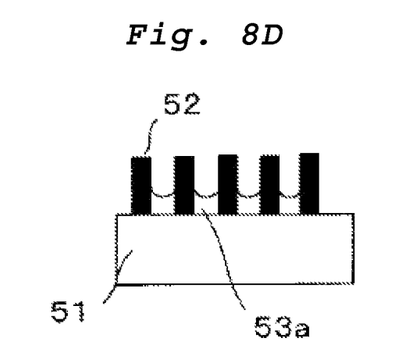
Figure 8E:
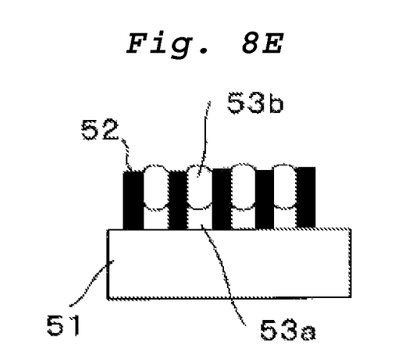

In step S72, as shown in FIG. 8D, first of all, the portions between the portions of the light shielding portion 52 are filled up with the material of the first lenses. Then, in the next step S73, as shown in FIG. 8E, after the portions between the portions of the light shielding portion 52 are filled up and cured, the material of the second lenses is filled and cured.

The position control unit 65 controls to move the conveyor bed 64. The UV curable ink is ejected from an inkjet printing section 62 onto the prescribed positions on the transparent substrate 51 to form the light shielding portion 52 (see FIG. 5). Then, UV light is irradiated from the UV light irradiating section 63 on the UV curable ink to cure the UV curable ink.

The light shielding portion 52 can be formed to any desired height. The light shielding portion 52 is formed by repeatedly carrying out the operation of ejection of the ink from the ink jet and irradiation with UV light.

Then, with the device shown in FIG. 6, the first ink lenses are formed (filling and curing), and the second lenses are formed (filling and curing).

FIG. 6 is a diagram illustrating an example of formation of the light shielding portion, etc., by using an inkjet method. However, the light shielding portion may also be formed using the photoresist method, printing method, and other methods for forming the light shielding portion.

In the following, the UV curable ink that can be adopted in this disclosure will be explained.

(Light Shielding Material)

For the light shielding material for forming the light shielding portion for the micro-lenses, first of all, the light shielding material is required to have optical light shielding properties and reflective characteristics. Then, it is required that the material have substantially the same jettability (flight characteristics) and dispersion stability, etc., as the characteristics of the inkjet UV curable ink. The pigment with light absorptivity may be adopted as such material.

Examples include carbon black, refined carbon, carbon nanotubes, and other carbonaceous pigments, iron black, zinc oxide, titanium oxide, chromium oxide, ion oxide, and other metal oxide pigments, zinc sulfide, and other sulfide pigments, phthalocyanine pigments, metal sulfate salts, carbonate salts, silicate salts, phosphate salts, and other salts as pigments, aluminum powder, bronze powder, zinc powder, and other metal powders as pigments.

(Reactive Materials)

The materials as the backbones of the light shielding portion and the lens portion are light curable materials and include reactive monomers, oligomers, and other reactive materials having polymeric functional groups and capable to polymerize under irradiation of light, and the photoinitiator that starts their polymerization. At present, there are a variety of the reactive materials for various applications. Generally speaking, they can be classified to a radical type and cationic type.

The acryl monomer/oligomer having acryloyl functional groups is a typical radical type. Consequently, polymerization can be accelerated by the radicals generated from the photoinitiator under light irradiation. The applications include coating, inks, optical materials, resist, etc. However, there are also disadvantages, such as generation of oxygen inhibition in polymerization and relatively significant contraction in volume after curing. For applications, it is necessary to have the disadvantages under control.

On the other hand, examples of the cationic type include epoxy, oxetane compound, and other cyclic ether compounds, as well as vinyl ether compounds having vinyl ether groups, etc. The photoinitiator is of the type that starts polymerization by means of the protons generated under light irradiation. Among them, the cyclic ether compound has the characteristic features that the contraction in volume after polymerization is small, and, in company with this, the close contact property with the substrate is excellent. Also, the cyclic ether compound differs from the radical type in that the cyclic ether compound can make polymerization without oxygen inhibition and has excellent ability in forming thin films.

As the light shielding portion for the micro-lenses, it is possible to make appropriate selection of the material having suitable ink characteristics comparable to an inkjet UV curable ink and suitable light shielding characteristics. There is no specific restriction on the type of the ink material of the present disclosure as long as the ink material has both the properties needed for the light shielding portion, such as the light shielding property, the reflectivity, the strength of the cured film, the UV light curing condition, etc., and the properties needed as the characteristics of the inkjet UV curable ink, such as the viscosity, the surface tension, and other properties, as well as the dispersion stability of the light shielding material and the adaptability with the head member, etc. The following are the examples.

The examples of the radical type materials include, depending on the number of the acryloyl groups in the molecules: monomers, such as monofunctional acrylate, bifunctional acrylate, and tri- or higher polyfunctional acrylates, and oligomers, such as polyester acrylate, urethane acrylate, epoxy acrylate, etc. Among them, the monofunctional monomer is often adopted as a reactive diluent, and as the inkjet ink, the monofunctional monomer can display a major role as the viscosity adjusting material.

The examples include isobornyl acrylate, acryloyl morpholine, dicyclopentadienyl acrylate, phenyl glycidyl ether, and other acrylic acid adducts, 2-hydroxy ethyl acrylate, 2-hydroxy propyl acrylate, 2-hydroxy butyl acrylate, 2-hydroxy hexyl acrylate, ethyl carbitol acrylate, tetrahydrofurfuryl acrylate, 2-acryloyloxy ethyl phthalate, benzyl acrylate, etc., as well as 2-hydroxy hexyl methacrylate, allyl methacrylate, benzyl methacrylate, cyclohexyl methacrylate, and other methacrylacrylate. In addition to the acryl type, N-vinyl pyrrolidone, N-vinyl caprolactam, etc., can be adopted as diluent.

Examples of the bifunctional acrylates include neopentyl glycol diacrylate, nonanediol diacrylate, tripropylene glycol diacrylate, tricyclodecane dimethanol diacrylate, bisphenyl A's EO adduct acrylate, etc. Examples of the polyfunctional acrylates include trimethylol propane triacrylate, pentaerythritol triacrylate, dipentaerythritol penta-acrylate, isocyanuric acid EO adduct's triacrylate, etc.

Examples of the cationic type materials include epoxy compounds, oxetane compounds, vinyl ether compounds, etc.

Examples of the epoxy compounds include the compounds having an epoxy group or an alicyclic epoxy group, which is present on either or both of a hydrocarbon group having a bivalent aliphatic skeleton or an alicyclic skeleton and a bivalent group having an aliphatic chain or an alicyclic skeleton in a portion thereof. Examples include the following compounds manufactured by Daicel Chemical Industries, Ltd.: Celloxide 2021, Celloxide 2021A, Celloxide 2021P, Celloxide 2081, Celloxide 2000, and Celloxide 3000 as alicyclic epoxy compounds; Cyclomer A200, Cyclomer M100 as (meth)acrylate compounds having epoxy groups; methacrylate containing methyl glycidyl groups, such as MGMA; low-molecular epoxy compounds, such as glycidol, β-methyl epichlorohydrin, α-pinene oxide, C12-C14 α-olefin monoepoxide, C16-C18 α-olefin monoepoxide, Daimac S-300K and other epoxidized soybean oil; Daimac L-500 and other epoxidized linseed oil; Epolead GT301, Epolead GT401, and other polyfunctional epoxy compounds, etc.

In addition, the following compounds may also be adopted: Cylacure and other alicyclic epoxy compounds manufactured by Dow Chemical Corp. of U.S.A., and compounds prepared by substituting the hydroxyl group terminals of the hydrogenated and aliphatic-converted low-molecular phenol compounds by epoxy-containing groups, ethylene glycol and glycerin, neopentyl alcohol and hexane diol, trimethylol propane, and other polyhydric aliphatic alcohol/alicyclic alcohol, and other glycidyl ether compounds, hexahydrophthalic acid, halogenated aromatic polyhydric carboxylic acid's glycidyl esters, etc.

Examples of the oxetane compounds include di[1-ethyl(3-oxcetanyl)]methyl ether, 3-ethyl-3-(2-ethyl hexyloxy methyl)oxetane, [(1-ethyl-3-oxetanyl)methoxy]cyclohexane, bis[(1-ethyl-3-oxetanyl)methoxy]cyclohexane, bis[(1-ethyl-3-oxetanyl)methoxy]norbornane, and other compounds prepared by introducing 1 or more oxetane-containing groups; other ether compounds prepared by hydration condensation of oxetane-containing alcohol, such as 3-ethyl-3-hydroxy methyl oxetane, to ethylene glycol and propylene glycol, neopentyl alcohol, and other aliphatic polyhydric alcohols.

Examples of the oxetane compounds containing aromatic skeletons include 1,4-bis((1-ethyl-3-oxetanyl)methoxy)benzene, 1,3-bis((1-ethyl-3 oxetanyl)methoxy)benzene, 4,4'-bis((3-ethyl-3 oxetanyl)methoxy)biphenyl, phenol novolac oxcetane, etc.

Examples of the vinyl ether compounds include 2-ethyl hexyl vinyl ether, butanediol divinyl ether, cyclohexane dimethanol divinyl ether, cyclohexane dimethanol monovinyl ether, diethylene glycol monovinyl ether, diethylene glycol divinyl ether, hexane diol divinyl ether, triethylene glycol divinyl ether, 4-hydroxy butyl vinyl ether, etc.

When there is also requirement on decrease in the viscosity and increase in the cured hardness in addition to increase of the curing rate, it is preferred that the vinyl ether compounds represented by the following formula (I) be added alone or in combination in the liquid ink.

The vinyl ether compound bonded with the methylene groups of the aliphatic glycol derivative or cyclohexane dimethanol, etc., has significant polymerization hindrance by pigment. Consequently, the vinyl ether compound used to be hard to adopt in as an ink. However, the compound represented by the following listed formula (I) and having vinyl ether groups bonded directly on the alicyclic skeleton, the terpenoid skeleton, or the aromatic skeleton has excellent curing property even when used together with the pigment. The proportion of the compound is preferably 50 parts by weight or lower with respect to the entirety of the liquid ink for maintaining the thermoplastic property. When higher solvent resistance and hardness are required even with degradation in the thermoplastic property, the proportion may be further increased to the entire quantity of the solvent to be cured by acid.

$$R13\text{-}R14\text{-}(R13)p \quad \text{Formula (I)}$$

In the above-listed formula (I), for R13, at least one represents the vinyl ether group, and that R13 represents the substituent group selected from the vinyl ether group and hydroxyl group. R14 represents the (p+1)-valent group selected from the alicyclic skeleton or the skeleton containing aromatic rings, and p represents 0 or positive integer. Here, when the R14 is a cyclohexane skeleton and p represents 0, at least one carbon on the ring has a ketone structure.

Examples of the (p+1)-valent organic group R14 include benzene ring and naphthalene ring, (p+1)-valent groups containing biphenyl rings, cycloalkane skeleton, norbornane skeleton, adamantane skeleton, tricyclodecane skeleton, tetracyclododecane skeleton, terpenoid skeleton, cholesterol skeleton, and other derived (p+1)-valent groups, etc.

More specifically, examples include compounds prepared by using vinyl groups to substitute the hydrogen atoms in the hydroxyl groups in cyclohexane(poly)ol, norbornane(poly)ol, tricyclodecane(poly)ol, adamantane(poly)ol, benzene(poly)ol, naphthalene(poly)ol, anthracene(poly)ol, biphenyl(poly)ol, and other alicyclic polyol, and phenol derivatives, as well as the compounds prepared by using vinyl groups to substitute the hydrogen atoms in the hydroxyl groups in polyvinyl phenol, phenol novolac, and other polyphenol compounds. For the compounds, even when a portion of the hydroxyl groups are left, or the methylene atoms of a portion of the alicyclic skeleton are substituted by the ketone groups, etc., compounds with decreased volatility are formed preferably. In particular, because the cyclohexyl monovinyl ether compound has a significant volatility, when the cyclohexyl monovinyl ether compound is adopted, it is preferred that the cyclohexane ring at least forms a cyclohexanone ring by oxidation.

In the following, the examples of the photoinitiators will be classified to a radical type and a cationic type. Here, the conventional types will be listed. Examples of the radical type include benzoyl ethereal type compounds, acetophenone type compounds, phosphine oxide type compounds, 1-hydroxy cyclohexyl phenyl ketone, diethoxy acetophenone, 2-hydroxy-2-methyl-2-methyl-1-phenyl propane-1-one, 2-benzyl-2-dimethylamino-1-(4-morpholinophenyl)-butanone-1, and other cleavage type compounds, benzophenone, 2,4-diethyl thioxanthone, isopropyl thioxanthone, and other hydrogen extracted type compounds, etc.

Examples of the cationic type compounds include onium salt, diazonium salt, quinone diazide compound, organic halides, aromatic sulfonate compounds, bisulfone compounds, sulfonyl compounds, sulfonate compounds, sulfonium compounds, sulfamide compounds, iodonium compounds, sulfonyl diazomethane compounds, and their mixtures, etc.

More specifically, examples include triphenyl sulfonium triflate, diphenyl iodonium triflate, 2,3,4,4-tetrahydroxy benzophenone-4-naphthoxinone diazide sulfonate, 4-N-phenylamino-2-methoxy phenyl diazonium sulfate, 4-N-phenylamino-2-methoxy phenyl diazonium p-ethyl phenyl sulfate, 4-N-phenylamino-2-methoxy phenyl diazonium 2-naphthyl sulfate, 4-N-phenylamino-2-methoxy phenyl diazonium phenyl sulfate, 2,5-diethoxy-4-N-4'-methoxy phenyl carbonyl phenyl diazonium-3-carboxy-4-hydroxy phenyl sulfate, 2-methoxy-4-N-phenyl phenyl diazonium-3-carboxy-4-hydroxy phenyl sulfate, diphenyl sulfonyl methane, diphenyl sulfonyl diazomethane, diphenyl disulfone, α-methylbenzoin tosylate, pyrogallol trimesylate, benzoin tosylate, etc.

The materials are used to form the UV curable ink for the micro-lens light shielding portion in the following steps of operation: a step in which the light shielding material is dispersed in a monomer; a step in which the obtained dispersion solution is mixed with appropriate monomers, oligomers and photoinitiator, as well as polymerization inhibitor as needed, and the mixture is agitated; and, finally, a step of refinement in which the crude grains and the undesired solid ingredients are removed by filtering or centrifugal separation or the like.

As a property of the UV curable ink, the mean grain size of the light shielding material should be 300 nm or smaller to have no influence on the jettability. Also, the viscosity at 25° C. should be in the range of 5 to 30 mPa·s by adding monomers, oligomers, etc., for adjustment.

When the UV curable ink for the lens section is prepared, in consideration of the wettability with respect to the light shielding portion and the relative wettability between the material of the first lens and the material of the second lens, and under the condition of the wettability with respect to the transparent substrate, the appropriate monomers or oligomers are selected and added. In addition, a photoinitiator or a polymerization inhibitor as needed are added, and the mixture is blended with stirring. After the step of operation, the refinement step is carried out in which the crude grains and the undesired solid ingredients are removed by filtering or centrifugal separation or the like.

Like the procedure for preparing the UV curable ink for the lens section, the material for the first lens and the material for the second lens can also be prepared by selecting appropriate monomers or oligomers in consideration of the relative relationship of the refractive index as an example of the present disclosure.

As shown in FIGS. 7 and 8A to 8E, according to the method for forming the micro-lens array in an example of the present disclosure, first, a light shielding portion is formed on the transparent substrate; second, the first lens material is applied by using the inkjet method between the portions of the light shielding portion formed in the step of operation; and, third, a lens material with a wettability with respect to the light shielding portion different from the first lens material is formed by using the inkjet method. In the following, first of all, the first step of forming the light shielding portion will be explained.

Figure 10:
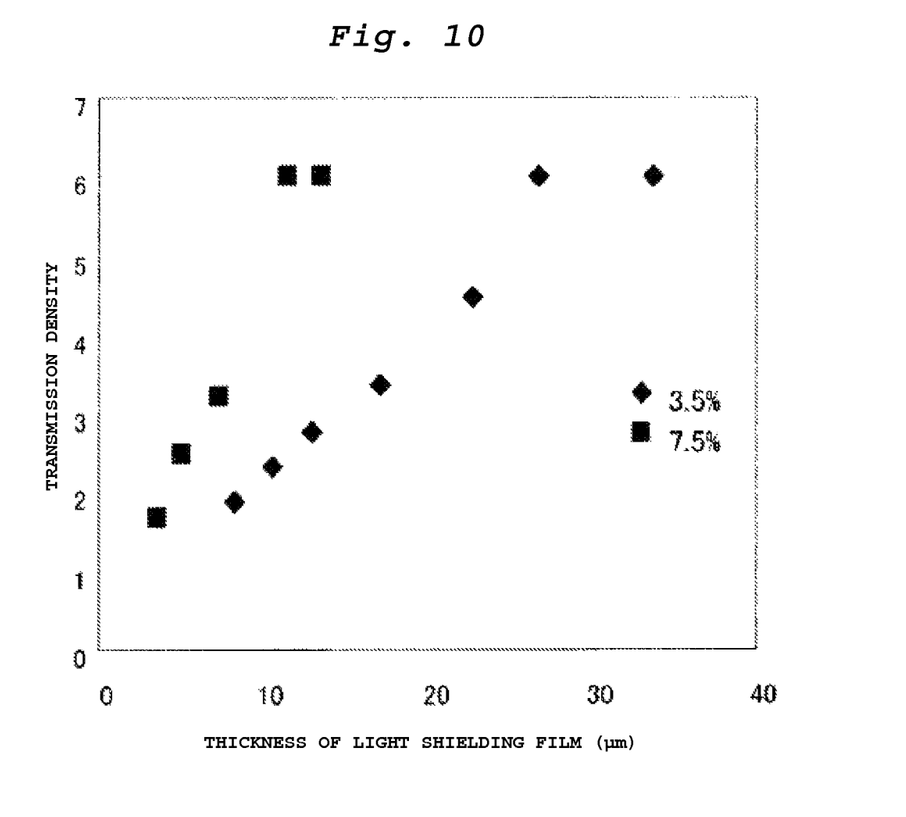
FIG. 10 is a diagram illustrating a relationship between a film thickness and transmission density of a light shielding portion in the embodiment.

FIG. 10 shows the relationship between the thickness of the light shielding portion and the light shielding characteristics when carbon black is adopted as the light shielding material. Here, UV light curing is carried out with an illuminance of 2000 mW/cm$^2$, an integrated light quantity of 400 mJ/cm$^2$, and at wavelength of 365 nm. In this drawing, the abscissa represents the thickness (μm) of the light shielding film, and the ordinate represents the transmission density.

For evaluation, the samples have concentration of the light shielding material (carbon black) of 3.5 wt % and 7.5 wt %, respectively. As can be seen from the drawing, when the concentration of the light shielding material is 3.5 wt %, a sufficiently high light shielding performance can be realized when the film thickness is about 24 μm or thicker, and, when the concentration of the light shielding material is 7.5 wt %, a sufficient light shielding performance can be realized when the film thickness is about 12 μm or thicker.

As can be seen from these results, it is clear that by changing the thickness of the light shielding portion corresponding to the content of the light shielding material, it is possible to realize sufficient performance for the light shielding portion of the micro-lens array. That is, by changing the film thickness of the light shielding portion formed from the light shielding ink and the film thickness in the lateral direction, and by changing the content of the light shielding material in the light shielding ink, it is possible to form the shape of the light shielding portion at will corresponding to the resolution of the lens.

In the following, the method for forming the light shielding portion will be explained with reference to the lens array forming device shown in FIG. 6. In this example, carbon black is adopted as the light shielding material of the ink of the light shielding portion, and the content of the light shielding material in the light shielding material is 3.5 wt %. Here, for the UV light irradiating section 63, the illuminance is 2000 mW/cm$^2$, the integrated light quantity is 400 mJ/cm$^2$, the wavelength is 365 nm, and the thickness of the light shielding portion 52 is finally selected to be 50 μm.

There is no specific restriction on the transparent substrate 51, as long as the transparent substrate 51 has sufficient mechanical strength and dimensional precision for the plate for maintaining the micro-lens array structure, and as long as the transparent substrate 51 has the necessary optical transmissivity. Examples of the materials of the plates or films that may be adopted include glass, acrylic resin, polycarbonate, polystyrene resin, alicyclic acrylic resin, alicyclic olefin resin, etc.

First of all, the transparent substrate 51 is arranged on the conveyor bed 64. Then, under control of the control unit 65, the conveyor bed 64 is driven towards the inkjet printing section 62 and the UV light irradiating section 63.

As shown in FIG. 8B, the inkjet printing section 62 prints the prescribed pattern of the light shielding portion on the transparent substrate. In this case, the position control unit 65 controls so that the quantity of the light shielding ink ejected from the inkjet printing section 62 onto the transparent substrate 51 corresponds to a thickness of 10 μm of the light shielding portion 52. The methods for controlling the ink quantity include the method whereby the voltage for ink ejection is adjusted and the method whereby the number of the ink droplets can be changed in the multi-drop ejection.

The UV light is irradiated from the UV light irradiating section 63 on the ink ejected on the transparent substrate 51. As a result, the first layer of the light shielding portion is formed. Then, the position control unit 65 drives the conveyor bed 64 back to where the transparent substrate 51 is set, and the next layer is formed.

With the same procedure as that for forming the first layer of the light shielding portion, a 10-μm-thick light shielding portion is formed on the same pattern. As a result, a 20-μm-thick light shielding portion is formed. As the operation is carried out repeatedly, it is possible to form the light shielding portion 52 with the prescribed height of 50 μm.

In this way, the light shielding portion 52 is formed on the transparent substrate 51. The height of the light shielding portion 52 can be designed as desired. When the light shielding portion 52 is formed with a height of 10 μm or lower, it is possible to form the light shielding portion 52 in a single round of the light shielding ink ejecting operation. By increasing the number of the operation rounds, it is possible to form a height of 50 μm or higher. Here, by adjusting the ejecting quantity from the inkjet printing section 62, it is possible to change the thickness of the light shielding portion formed in each round of operation. Consequently, it is possible to carry out ejecting for printing under appropriate conditions corresponding to the shape and characteristics of the designed lenses.

In the following, the operation for forming the first lenses and the second lenses will be shown. After formation of the prescribed micro-lens pattern on the transparent substrate 51, the device shown in FIG. 6 is adopted to eject and print the first lens ink on the portions of the transparent substrate 51 where the light shielding portion is not formed.

The first lens ink has a good wettability with the light shielding portion 52, and the first lens ink wets and spreads wide on the portions free of the light shielding portion on the transparent substrate 51 smoothly with respect to the light shielding portion 52. The quantity of the first lens ink ejected is sufficient to form a height of 50 μm of the light shielding portion 52, and the shape of the liquid surface can be formed as a concave meniscus. The first lens ink printed in the prescribed quantity on the surface free of the light shielding portion is irradiated by the UV light from the UV light irradiating section 63 just as in the case when the light shielding portion is formed, so that the first lens ink is cured. In this case, the UV light irradiating device has an illuminance of 1000 mW/cm$^2$, an integrated light quantity of 200 mJ/cm$^2$, and at wavelength of 365 nm.

After formation of the first lens section, using the same method as that for forming the first lens section, the second lens ink is printed on the first lens section. The second lens ink is then cured so that the second lens ink is formed to bury the first lens section. Here, the ink liquid is ejected and printed so that the liquid surface has a convex shape up to the height of the light shielding portion 52. In this case, the second lens ink has wettability with the surface of the light shielding portion poorer than that of the second lens ink, so that the second lens ink can form a smooth convex meniscus shape from the surface of the light shielding portion at the height of the light shielding portion. As the wettability is poor, the wetting spread of the second lens on the upper surface of the light shielding portion is smaller, and it is possible to form the lens shape up to the height of the light shielding portion. In the region where the ink does not wet the light shielding material, it is possible to change the quantity of the second lens ink printed, so that it is possible to control the shape of the curved surface within the adjustable quantity range.

For the second lens ink printed in a prescribed quantity on the first lens ink section on the surface free of the light shielding portion, the UV light is irradiated from the UV light irradiating section 63 just as that for the first lens ink so that the second lens ink is cured. In this case, the UV light irradiating section 63 has an illuminance of 500 mW/cm$^2$, an integrated light quantity of 100 mJ/cm$^2$, and at wavelength of 365 nm.

In the operation, UV light irradiation is carried out after the first lens ink is filled until the upper surface of the light shielding portion. However, this is merely an example. One may also adopt a scheme in which the ejection and printing operation is divided to plural rounds, and, in each round, UV light irradiation is carried out to laminate and cure the first lens ink. In this case, the UV light irradiation intensity can be set lower, and this can relax contraction during curing of the lenses. The curing method can be selected corresponding to the characteristics of the material of the lenses.

In the above, an example in which the first lens section is filled until the upper surface of the light shielding portion is presented. Here, filling quantity of the first lenses and the second lenses, that is, the thickness of the lenses, can be selected at will, and the filling ratio can be adjusted correspondingly to the desired optical characteristics of the lenses.

Also, the following method may be adopted as an example about the manufacturing condition. For the micro-lens array explained above in the embodiment, the micro-lenses are arranged on one surface. However, one may also adopt a scheme in which the micro-lens arrays are formed on both surfaces. In this case, after the micro-lens array is formed on the outer surface, the transparent substrate is inverted and set, and the micro-lens array for the back surface is formed.

The UV light irradiating section 63 in this embodiment carries out irradiation of UV light from only the inkjet printed surface of the transparent substrate 51. However, one may also adopt a scheme in which the portion of the conveyor bed 64 where the transparent substrate 51 is attached is made of, e.g., a glass sheet or the like that is transparent for the UV light, and the UV light is irradiated from the back side to cure the UV curable ink. In this way, it is possible to improve the curing efficiency of the ink.

In the embodiment explained above, after the transparent substrate 51 is set on the conveyor bed 64, while the conveyor bed 64 is driven to move, the UV curable ink is ejected from the inkjet printing section 62, and the UV curable ink is cured by the UV light irradiating section 63 to form the light shielding portion 52 and the lens section. However, one may also adopt a scheme in which the inkjet printing section 62 and the UV light irradiating section 63 are driven to scan with respect to the conveyor bed 64. In addition, the following scheme may also be adopted: plural inkjet printing sections and UV light irradiating sections are arranged, so that the light shielding portion, the first lenses and the second lenses can be formed at even higher efficiency.

In addition, when a cationic type material is adopted in the UV curable ink, a heating step is added after the step of UV light irradiation, so that curing can be carried out more efficiently. In particular, when curing is carried out in the light shielding portion, as a light shielding material is contained in the light shielding ink, the UV light may hardly reach the interior of the light shielding ink, so that there is a tendency that the curing characteristics when the UV light is irradiated become poorer than the lens ink. Here, by heating after irradiation, the cations generated in heating diffuse, so that polymerization curing can be well carried out for the monomers and oligomers and other reactive materials.

According to the embodiment of the present disclosure described above, by sufficiently suppressing the wettability of the second lens as the upper layer of the two-layer lens structure formed between the portions of the light shielding portion, it is possible to improve the light condensing property and to improve the optical characteristics.

In the embodiment, the light shielding portion, the first lenses and the second lenses are formed by using the inkjet method. However, they may also be formed using dispensers according to the forming method of the present disclosure.

As a method for forming the light shielding portion and the lens section materials, one may also adopt a scheme in which dispensers are adopted to coat the liquids in minute quantity. For example, one may adopt the following types of dispensers: the non-contact jet dispenser (Cyber Jet 2) manufactured by Musashi Engineering Co., Ltd., the micro-dispenser (Heishin Micro-Dispenser) manufactured by Heishin Sobi K.K., the micro-dispenser (Nanojet) manufactured by Micro Drop Technology Co., Ltd., etc. By using the devices, a prescribed quantity of the light shielding portion liquid or lens section material liquid is coated, and curing is carried out right after coating, and the coating and curing operation are carried out repeatedly to form the lens structure.

In the embodiment explained above, the first lens material and the second lens material have different wettability. However, one may also adopt a scheme in which the first lens material and the second lens material have different optical refractive index characteristics instead of different wettability. The micro-lens array is one type of the lens array.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lens array comprising:
a transparent substrate arranged on a plane perpendicular to an optical axis;
first lenses arranged on the transparent substrate, and configured to condense a light irradiated from an object point;
light shielding portions arranged on the transparent substrate except in areas of the first lenses to shield the light irradiated from the object point; and
second lenses, which are laminated on the first lenses, and which are made of a material with a wettability different from that of a material of the first lenses.

2. The lens array of claim 1, wherein the material of the second lenses has optical refractive index characteristics different from the material of the first lenses.

3. The lens array according to claim 1, wherein
material of the light shielding portions, the material of the first lenses, and the material of the second lenses are UV curable inks.

4. The lens array according to claim 1, wherein
the wettability of the material of the first lenses with respect to the material of the light shielding portions is higher than the wettability of the material of the second lenses with respect to the material of the light shielding portions.

5. The lens array according to claim 4, wherein
an outer surface of each of the second lenses is formed with a contact angle at which the outer surface protrudes out with respect to the light shielding portions, that is larger than a zero contact angle.

6. The lens array according to claim 1, wherein
the wettability of the material of the first lens with respect to the material of the transparent substrate is higher than the wettability of the material of the second lens with respect to the material of the transparent substrate.

7. The lens array according to claim 1, wherein
the first lenses are made of an acrylic resin.

8. The lens array according to claim 1, wherein
the first lenses are made of a cationic curable resin.

9. The lens array according to claim 1, wherein an outer surface of each of the second lenses is convex relative to a surface of the light shielding portions, and wherein each of the outer surfaces of the second lenses protrudes at a contact angle relative to a horizontal plane of the light shielding portions and the contact angle is greater than about 60 degrees and less than about 90 degrees.

10. The lens away according to claim 1, wherein
each of the first lenses has a curved surface, and
the second lenses are laminated directly on the curved surfaces of the first lenses such that each of the second lenses has a curved surface that corresponds to the curved surface of a respective first lens.

11. A method of forming a lens array, comprising:
forming a transparent substrate on a plane;
forming light shielding portions on the transparent substrate to shield a light irradiated from an object point;
forming first lenses on the transparent substrate between the light shielding portions; and
laminating second lenses on the first lenses between the light shielding portions, a wettability of a material of the second lenses being different from that of a material of the first lenses.

12. The method of claim 11, wherein the first lenses and the second lenses are formed by an inkjet method.

13. The method of claim 11, wherein the material of the second lenses have optical refractive index characteristics different from the material of the first lenses.

14. The method of claim 11, wherein material of the light shielding portions, the material of the first lenses, and the material of the second lenses are UV curable inks.

15. The method of claim 11, wherein the wettability of the material of the first lenses with respect to the light shielding portions is higher than the wettability of the material of the second lenses with respect to the light shielding portions.

16. The method of claim 11, wherein a wettability of the first lenses with respect to the transparent substrate is higher than a wettability of the second lenses with respect to the transparent substrate.

17. The method of claim 11, wherein an outer surface of each of the second lenses is convex relative to a surface of the light shielding portions, and wherein each of the outer surfaces of the second lenses protrudes at a contact angle relative to a horizontal plane of the light shielding portions and the contact angle is greater than about 60 degrees and less than about 90 degrees.

18. The method of claim 11, wherein
each of the first lenses has a curved surface, and
the second lenses are laminated directly on the curved surfaces of the first lenses such that each of the second lenses has a curved surface that corresponds to the curved surface of a respective first lens.

19. An image forming apparatus comprising:
sensors arranged as a row in a main scanning direction of an original document;
an illuminating device arranged in the main scanning direction of the original document for illuminating light on the surface of the original document; and
at least one scanning head including:
a transparent substrate formed on a plane perpendicular to an optical axis,
light shielding portions formed on the transparent substrate and made of a material that shields the illuminated light, and
first and second lenses, which are laminated together and arranged in the main scanning direction between the light shielding portions,
wherein a wettability of materials of the first and second lenses are different.

20. The image forming apparatus according to claim 19, wherein material of the light shielding portions, the material of the first lenses, and the material of the second lenses are UV curable inks.

21. The image forming apparatus according to claim 19, wherein
each of the first lenses has a curved surface, and
the second lenses are laminated directly on the curved surfaces of the first lenses such that each of the second lenses has a curved surface that corresponds to the curved surface of a respective first lens.

* * * * *